(12) United States Patent
Ichikawa et al.

(10) Patent No.: US 8,241,806 B2
(45) Date of Patent: Aug. 14, 2012

(54) FUEL CELL SYSTEM

(75) Inventors: Osamu Ichikawa, Saitama (JP); Kuri Kasuya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1311 days.

(21) Appl. No.: 11/262,010

(22) Filed: Oct. 28, 2005

(65) Prior Publication Data
US 2006/0099471 A1 May 11, 2006

(30) Foreign Application Priority Data

Nov. 8, 2004 (JP) ................................ 2004-323537
Nov. 24, 2004 (JP) ................................ 2004-338377

(51) Int. Cl.
*H01M 8/04* (2006.01)
(52) U.S. Cl. ........ 429/436; 429/120; 429/433; 429/434; 429/435; 429/437; 429/440
(58) Field of Classification Search .................. None
See application file for complete search history.

(56) References Cited

U.S. PATENT DOCUMENTS 6,737,184 B2 * 5/2004 Rusta-Sellehy et al. ...... 429/411

FOREIGN PATENT DOCUMENTS

| JP | 07-240223 | 9/1995 |
|---|---|---|
| JP | 08-321316 | 12/1996 |
| JP | 2001-214478 | 8/2001 |
| JP | 2002-313389 | 10/2002 |
| JP | 2003-178781 | 6/2003 |
| JP | 2004-259491 | 9/2004 |
| JP | 2006-134743 | 5/2006 |

* cited by examiner

*Primary Examiner* — Melvin C Mayes
*Assistant Examiner* — Colin W Slifka
(74) *Attorney, Agent, or Firm* — Fish & Richardson P.C.

(57) ABSTRACT

A fuel cell system includes a fuel cell, a fluid passage for warming, a gas-liquid separator, a supply passage and a recirculating module. The fuel cell generates power with supply of a reaction gas. The gas-liquid separator separates moisture contained in an anode exhaust gas which is discharged from the fuel cell. The supply passage returns the anode exhaust gas, from which the moisture has been separated by the gas-liquid separator, to an inlet side of the reaction gas. The recirculating module mixes the anode exhaust gas, which is returned via the supply passage, with the reaction gas. The gas-liquid separator lies adjacent to the recirculating module, and the fluid passage for warming is disposed between the gas-liquid separator and the recirculating module.

9 Claims, 3 Drawing Sheets

FUEL CELL SYSTEM

BACKGROUND OF THE INVENTION

The present invention relates to a fuel cell system, which circulates an anode exhaust gas discharged from a fuel cell so as to recycle it.

As a trend for restricting an amount of discharged carbon dioxide prevails, which is considered to cause earth warming, attention has recently concentrated on fuel cell electric vehicles (FCEV). An FCEV has an onboard fuel cell (FC), which generates power by electrochemical reaction between hydrogen ($H_2$) and oxygen ($O_2$) existing in air. Electricity generated by the fuel cell is supplied to a motor so as to produce driving power.

In a fuel cell system, hydrogen (anode gas), which is sent from a high-pressure hydrogen tank, is supplied after depressurization to an anode via a hydrogen supply line. On the other hand, air (cathode gas) pressurized by an electric compressor is supplied to a cathode via an air supply line. Hydrogen not consumed in the fuel cell (anode exhaust gas) is discharged via a line for discharging anode exhaust gas. Similarly, air having been subjected to reaction (cathode exhaust gas) is discharged via a line for discharging cathode exhaust gas.

The anode exhaust gas discharged from the fuel cell contains the hydrogen, which is not consumed as described above. A fuel cell system having a gas-liquid separator is known (See patent document 1), which separates reaction product water (hereinafter referred to as "product water"), which is contained in the form of water vapor, from an anode exhaust gas so as to recycle the unconsumed hydrogen. The gas-liquid separator, in which a supplied cooling liquid cools the anode exhaust gas so that the water vapor is condensed, discharges resulting liquid water via a drain line. On the other hand, the anode exhaust gas, from which the product water has been separated, is supplied to an ejector. The ejector carries out mixture of the anode exhaust gas and an anode gas sent from a high-pressure hydrogen tank, supplying the mixture to an anode of the fuel cell. In this way, recycling of hydrogen contained in the anode exhaust gas is implemented.
Patent document 1: Japanese Published Patent Application H8-321316 (paragraphs 0016-0017, FIG. 1)

It is known that because product water is contained at a high ratio in an anode exhaust gas discharged from a fuel cell, it sometimes remains in the anode exhaust gas due to incomplete separation when supplied to an ejector. If this happens, it is feared that liquid product water, which is generated by condensation of the product water remaining in the anode exhaust gas in a line connecting a gas-liquid separator and the ejector, may be sucked by the ejector. When an anode gas containing the liquid product water is supplied to the fuel cell, it may be that possible variation in a mass flow and pressure of the anode gas supplied to the fuel cell has an adverse effect on stability of power generation. This has been more frequently occurred when the line is arranged to be longer.

There has been another problem that when a fuel cell is left for a long period of time under low temperature conditions, below freezing point for example, with product water remaining in a drain line, which is separated by a gas-liquid separator, the product water is frozen to block the drain line, having an adverse effect on starting of the fuel cell.

SUMMARY OF THE INVENTION

The present invention seeks to provide a fuel cell system which is able to prevent condensation in a supply passage through which an anode exhaust gas is sent from a gas-liquid separator to a recirculating module such as an ejector. In addition, the present invention seeks to provide a fuel cell system which is able to prevent freezing of product water in a drain line and the like, which is separated by a gas-liquid separator.

It is an aspect of the present invention to provide a fuel cell system, which comprises a fuel cell, a fluid passage for warming, a gas-liquid separator, a supply passage and a recirculating module. Brief description is given of each component. The fuel cell generates power with supply of a reaction gas. The gas-liquid separator separates moisture contained in an anode exhaust gas which is discharged from the fuel cell. The supply passage returns the anode exhaust gas, from which the moisture is separated by the gas-liquid separator, to an inlet side of the reaction gas. The recirculating module mixes the anode exhaust gas, which is returned via the supply passage, with the reaction gas. The gas-liquid separator lies adjacent to the recirculating module, and the fluid passage for warming is disposed between the gas-liquid separator and the recirculating module.

In the fuel cell system described above, the anode exhaust gas, which is warmed by the fluid passage for warming after having passed through the gas-liquid separator, is sent to the recirculating module. Even if the anode exhaust gas contains moisture, it is possible to send the anode exhaust gas to the recirculating module via the supply passage while the moisture is kept in the form of water vapor. This means that it is possible to decrease relative humidity of the anode exhaust gas, which prevents condensation of the moisture in the supply passage. Because supply of the reaction gas containing liquid water to the fuel cell is prevented, it is possible to achieve a fuel cell system excelling in stability of power generation.

The present invention provides the following advantages. It is possible to prevent the anode exhaust gas, which has passed through the gas-liquid separator, from being cooled to condense without introduction of an additional heat source. Also, it is possible to efficiently warm the anode exhaust gas in the supply passage, which is sent from the gas-liquid separator to the recirculating module, which are laid out adjacent to each other. Furthermore, even if the reaction gas is cold, which is supplied by a supply system of reaction gas, it is possible that the moisture contained in the anode exhaust gas is turned to not being susceptible to condensation when it is mixed with the reaction gas in the recirculating module.

It is another aspect of the present invention to provide a fuel cell system, which further comprises a collecting portion. The collecting portion is provided under the gas-liquid separator and collects water which is separated by the gas-liquid separator. The fluid passage for warming lies in thermal contact with the collecting portion.

The fuel cell system described above, in which the collecting portion and a drain pipe are warmed by the fluid passage for warming during a low-temperature start, is able to prevent the product water separated by the gas-liquid separator from freezing in the drain pipe.

It is still another aspect of the present invention to provide a fuel cell system, which comprises a fuel cell, a gas-liquid separator, a collecting portion and a fluid passage for warming. Brief description is given of each component. The fuel cell generates power with supply of a reaction gas. The gas-liquid separator separates moisture contained in an anode exhaust gas which is discharged from the fuel cell. The collecting portion collects water separated by the gas-liquid separator, and is provided under the gas-liquid separator. The fluid passage for warming lies in thermal contact with the collecting portion. And one of a fluid coming out of the fuel cell and an oxidant gas to be introduced into the fuel cell flows through the fluid passage for warming.

The fuel cell system described above, which is able to quickly thaw out a drain pipe if it freezes, is able to promptly discharge product water during a low-temperature start.

It is yet another aspect of the present invention to provide a fuel cell system, which further comprises a drain pipe for discharging the water collected in the collecting portion. The drain pipe is extended from the collecting portion. And the fluid passage for warming lies in thermal contact with the drain pipe.

The fuel cell system described above, which thaws out the drain pipe if it freezes, is able to quickly discharge product water during a low-temperature start.

It is a further aspect of the present invention to provide a fuel cell system, in which the drain pipe lies inside the fluid passage for warming.

The setup described above provides an efficient heat transfer from the fluid passage for warming to the drain pipe.

It is a still further aspect of the present inspection to provide a fuel cell system, in which the fluid is at least one of an anode exhaust gas, a cathode exhaust gas and a cooling medium which circulates to cool the fuel cell.

The fuel cell system described above, which thaws out the drain pipe if it freezes, is able to quickly discharge product water during a low-temperature start.

DESCRIPTION OF THE PREFERRED EMBODIMENTS

Description is now given of an embodiment, to which a fuel cell system according to the present invention is applied, with reference to drawings.

Figure 1:
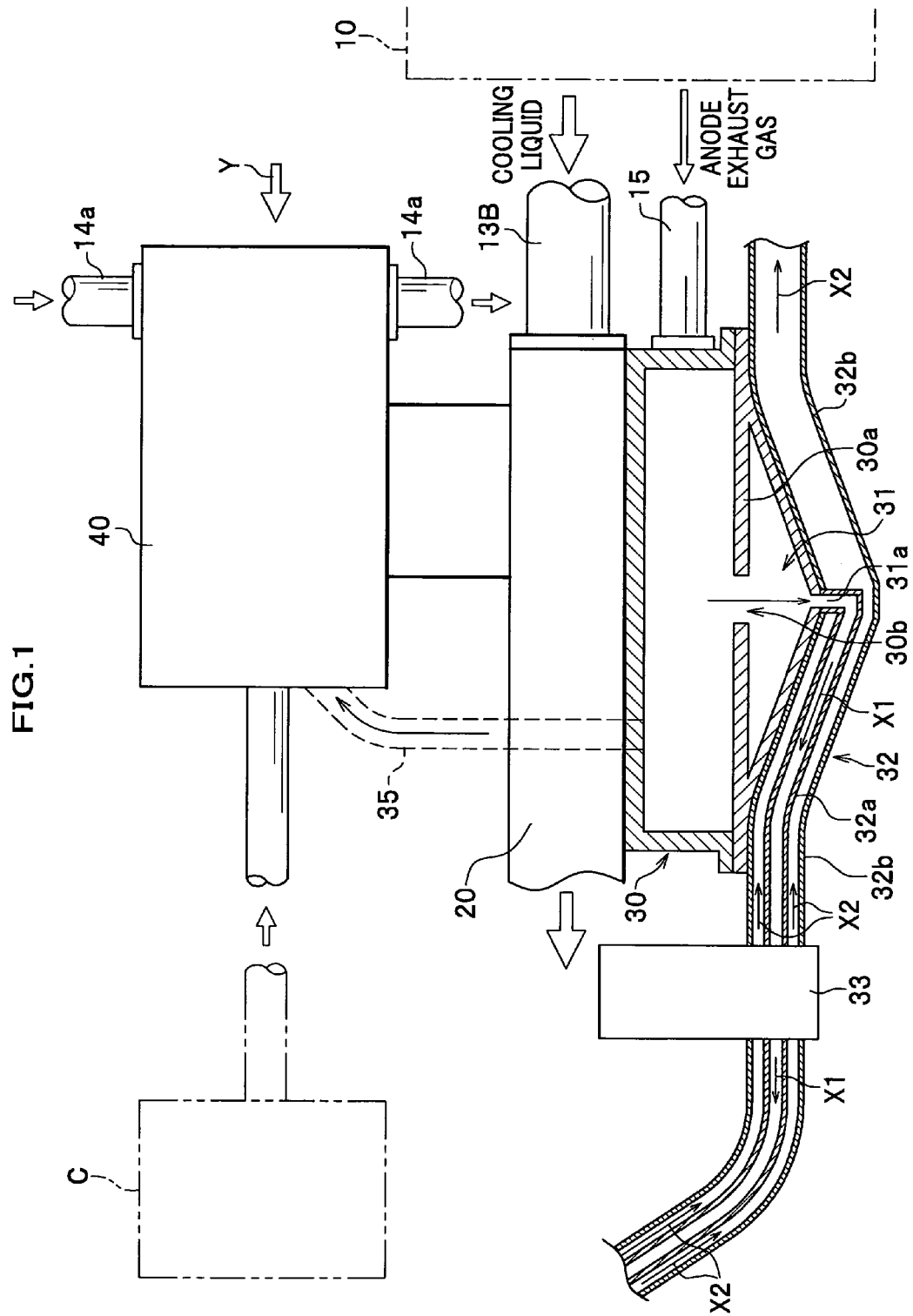
FIG. 1 is a schematic diagram illustrating a main portion of a fuel cell system according to the present invention.

As shown in FIG. 1, a fuel cell system according to the present invention includes a fuel cell 10, a coolant passage 20, a gas-liquid separator 30 and an ejector 40 serving as a recirculating module. The gas-liquid separator 30 and the ejector 40 are arranged to lie adjacent to each other so that they can mutually work to better advantage. The coolant passage 20 is disposed between the gas-liquid separator 30 and the ejector 40. In this embodiment, the coolant passage 20 corresponds to a fluid passage for warming in the appended claims.

Figure 2:
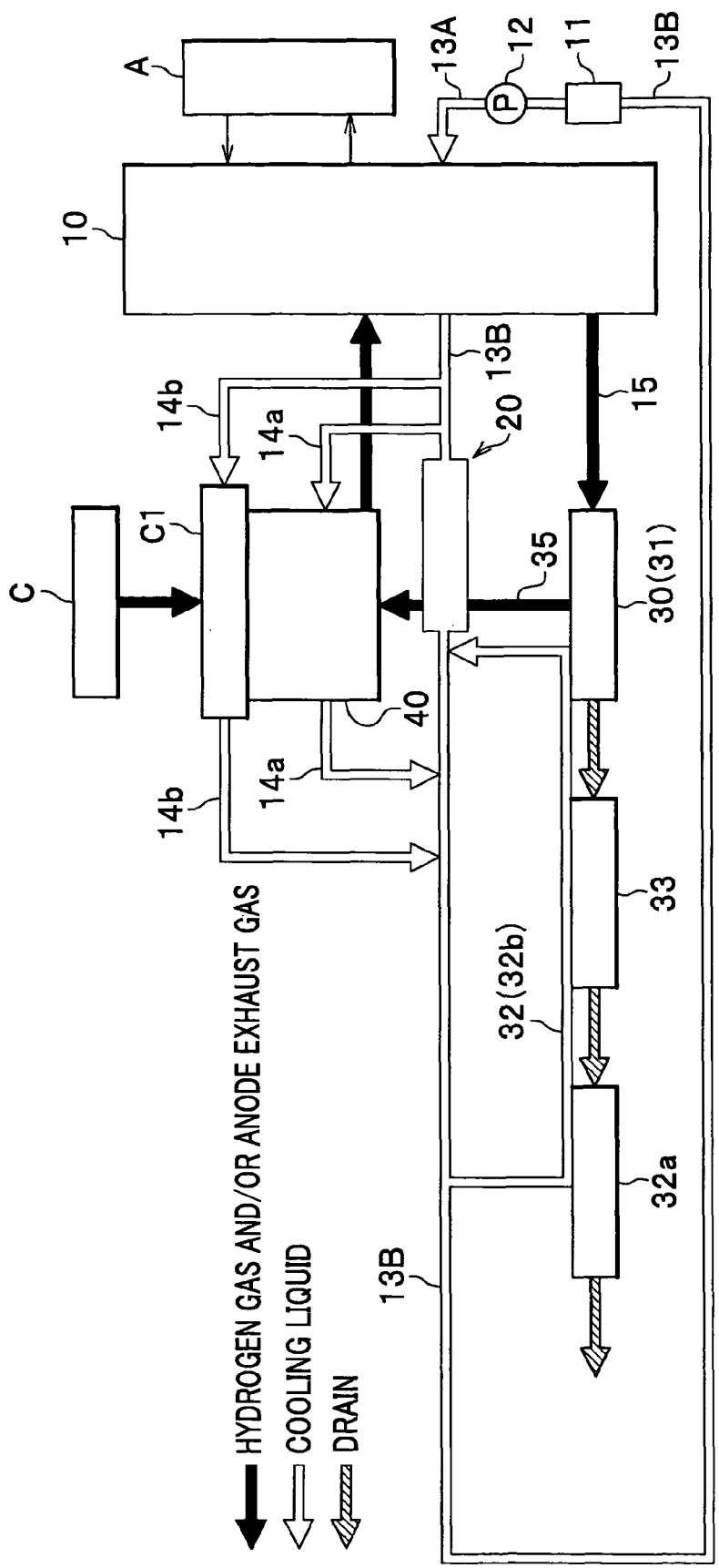
FIG. 2 is a schematic diagram illustrating a flow of cooling liquid and hydrogen gas in a fuel cell system according to the present invention.

As shown in FIG. 2, hydrogen (anode gas) is supplied from a hydrogen supply unit C to an anode (not shown) of the fuel cell 10 via a hydrogen heat exchanger C1 and the ejector 40. On the other hand, air (cathode gas) as an oxidant gas is supplied from an air supply unit A to a cathode (not shown) of the fuel cell 10. In this way, the fuel cell 10 generates power by electrochemical reaction. The power is supplied to an onboard motor of a vehicle (not shown). The fuel cell 10 is a fuel cell of PEM type, which has a stacked setup of some tens to some hundreds of individual cells. Each individual cell has a membrane electrode assembly (MEA) which is made of an anode and a cathode interposing an electrolyte. An MEA is sandwiched by separators to form an individual cell. PEM represents a short for Proton Exchange Membrane.

As shown in FIG. 1, the coolant passage 20, which runs between the gas-liquid separator 30 and the ejector 40, is arranged to be substantially integrated with them. The coolant passage 20 provide a passage through which a cooling liquid (cooling medium) for cooling the fuel cell 10 passes. As shown in FIG. 2, a cooling system provides circulation of the cooling liquid. The cooling liquid, which has passed through the fuel cell 10 and the coolant passage 20, is again supplied to the fuel cell 10 via a heat exchanger 11. The cooling system includes at least an outward passage 13A, which sends the cooling liquid having been rejected heat by the heat exchanger 11 to the fuel cell 10, and a homeward passage 13B, which sends back the cooling liquid absorbing heat from the fuel cell 10 to the heat exchanger 11.

In the present embodiment, a portion of the homeward passage 13B is arranged to serve as the coolant passage 20. The cooling liquid warmed up while passing through the fuel cell 10, flows through the coolant passage 20, which lies downstream of the fuel cell 10.

Referring to FIG. 1 again, the gas-liquid separator 30 is responsible for separating reaction product water (water content) from the anode exhaust gas, which is a residual hydrogen gas with high humidity discharged from the fuel cell 10.

Between the gas-liquid separator 30 and the ejector 40, a supply passage 35 is disposed, which returns the anode exhaust gas whose reaction product water has been separated by the gas-liquid separator 30, to a closer side of an inlet of the ejector 40, through which the reaction gas (hydrogen) is supplied. The supply passage 35 is disposed close to the coolant passage 20 so that it is possible to warm the anode exhaust gas flowing through the supply passage 35 with heat possessed by the cooling liquid flowing through the coolant passage 20. It may be preferable but not mandatory that the coolant passage 20 is arranged to penetrate the supply passage 35.

A collecting portion 31, whose section has a shape of reversed triangle, is provided under the gas-liquid separator 30. Between the gas-liquid separator 30 and the collecting portion 31, a partitioning plate 30a having a plurality of holes 30b is disposed, only one of which is shown in the form of magnification in FIG. 1 as an example. The reaction product water separated by the gas-liquid separator 30 travels through the holes 30b, accumulated in the collecting portion 31.

A coolant passage 32 is provided under the collecting portion 31 in such a manner that the coolant passage 32 is attached to a bottom of the collecting portion 31. The coolant passage 32 has a double-pipe setup including a drain pipe 32a and an outer pipe 32b. The drain pipe 32a, which has fluid communication with an outlet 31a of the collecting portion 31, serves as a drain passage. On the other hand, the outer pipe 32b, which has fluid communication with the homeward passage 13B (See FIG. 2), provides a passage for circulating the cooling liquid. In this way, the reaction product water collected in the collecting portion 31 is discharged via the drain pipe 32a of the coolant passage 32. The cooling liquid coming via the homeward passage 13B is supplied under the bottom of the collecting portion 31 via the outer pipe 32b. The drain pipe 32a is warmed up by the warm cooling liquid having passed through the fuel cell 10. A drain flows through the drain pipe 32a in a direction of arrow X1 shown in FIG. 1. In contrast, the cooling liquid flows through the outer pipe 32b in a direction of arrow X2. Because an upstream portion of the outer pipe 32b lies downstream of the drain pipe 32a, a downstream portion of the drain pipe 32a is warmed up by the cooling liquid earlier than its upstream portion. In this connection, the coolant passage 32 has a setup that its portion upstream of the outlet 31*a* with respect to a flow direction of the cooling liquid (direction of arrow X2 in FIG. 1) has a double-pipe setup including the drain pipe 32*a* and the outer pipe 32*b*. In contrast, the other portion of the coolant passage 32 downstream of the outlet 31*a* is made of a single pipe, the outer pipe 32*b*.

A drain valve 33 is connected with the coolant passage 32. Selection of one of opening and closing of the drain valve 33 determines a status of the drain pipe 32*a*, opening or closing. Because pressures in the gas-liquid separator 30 and the collecting portion 31 are higher due to the anode exhaust gas discharged from the fuel cell 10, the drain is discharged via the drain pipe 32*a* when the drain valve 33 is opened. An end of the drain pipe 32*a* of the coolant passage 32 is fluidly connected with a diluter (not shown).

A pressure reducing valve (not shown) is provided upstream of the ejector 40. A humidifier of hollow fiber membrane (not shown), serving as a humidifier of water permeable membrane, is disposed downstream of the ejector 40. Furthermore, an air cleaner, a humidifier and an electric compressor, neither of which is shown, are disposed in the air supply unit A.

Next, description is given of how the embodiment according to the present invention works. When a fuel cell system is started, an amount of cathode gas is supplied to a fuel cell 10 according to an amount of current determined by an electric control unit (not shown), which should be extracted from the fuel cell 10, taking into account an amount of depressing of a throttle pedal (not shown) and power consumed by units such as lights and an air conditioner (not shown). At the same time, an anode gas (hydrogen gas) is supplied by a hydrogen supply unit C to the fuel cell 10, in which hydrogen travels from an anode to a cathode to generate power. Residual hydrogen, which has not been consumed at the anode, is discharged via a passage 15 for anode exhaust gas into a gas-liquid separator 30, where moisture is separated from an anode exhaust gas containing the hydrogen. The anode exhaust gas which is deprived of moisture is sent to the ejector 40 via a supply passage 35. At the same time, air having reacted at a cathode is discharged in the form of a cathode exhaust gas.

The ejector 40 adds fresh hydrogen gas sent by the hydrogen supply unit C to the anode exhaust gas sent from the gas-liquid separator 30, supplying the mixture to the anode of the fuel cell 10. Repetition of the steps described above allows circulation of the anode exhaust gas, resulting in its recycle.

On the other hand, a pump 12, which is controlled to circulate a cooling liquid in a cooling system, supplies the cooling liquid to the fuel cell 10 via an outward passage 13A. The cooling liquid which has cooled the fuel cell 10 by absorption of its heat is discharged into a homeward passage 13B and supplied to a coolant passage 20.

A part of the cooling liquid discharged from the fuel cell 10 into the homeward passage 13B is supplied to the ejector 40 and a hydrogen heat exchanger C1 via branched passages 14*a* and 14*b*, respectively. Exchanging heat with the ejector 40 and the hydrogen heat exchanger C1, the part of the cooling liquid returns to the homeward passage 13B, where it joins with a mainstream.

Figure 3:
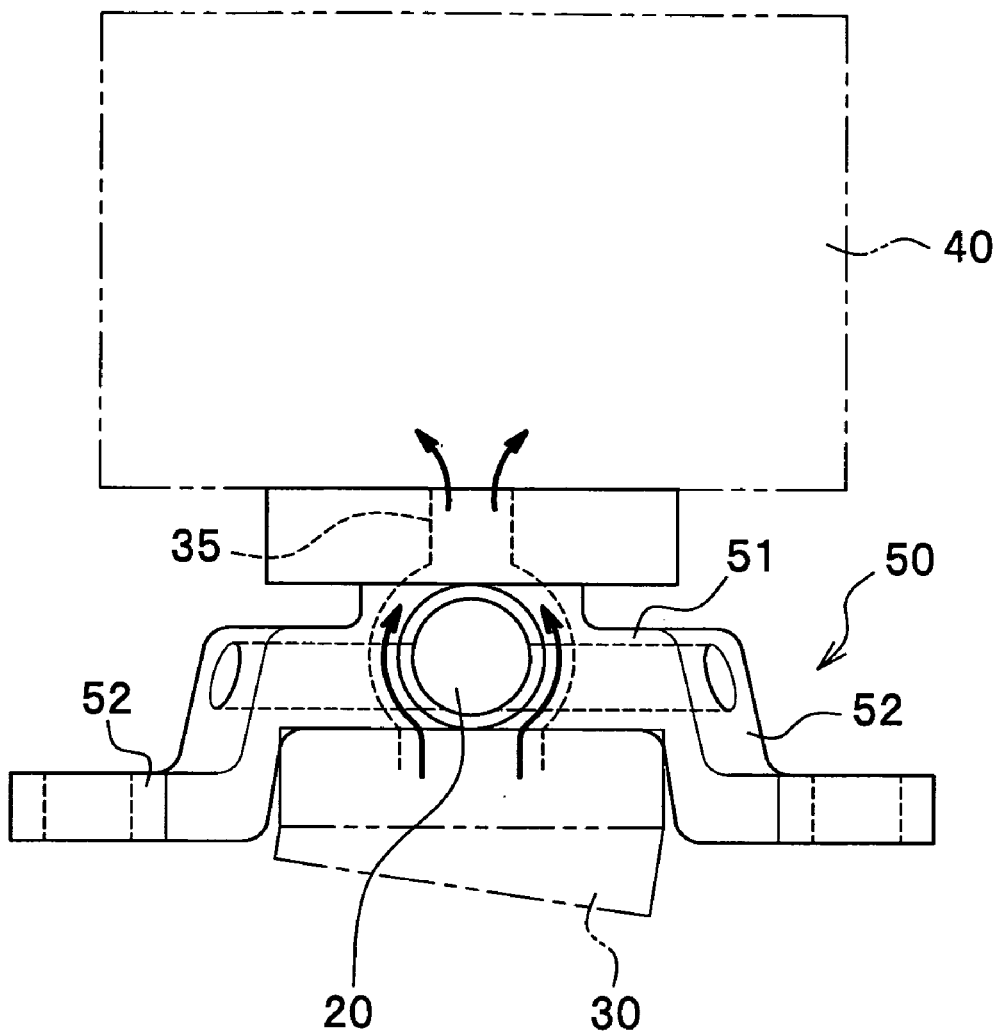
FIG. 3 is a schematic diagram illustrating an exemplary setup of the fuel cell system shown in FIG. 1, as viewed from an arrow Y.

As shown in FIG. 3, the gas-liquid separator 30 and the ejector 40 are attached under and above a mount 50, respectively, in which the coolant passage 20 is provided, so that these components are integrally configured.

The mount 50 includes a base 51 and a plurality of legs 52, which is integrally formed with the base 51. The coolant passage 20 penetrates a middle portion of the base 51. The supply passage 35 is disposed between the gas-liquid separator 30 and the ejector 40 in such a manner that the supply passage 35 runs in contact with a peripheral surface of the coolant passage 20. In this way, heat exchange is carried out between the cooling liquid running through the coolant passage 20 and the anode exhaust gas running through the supply passage 35, which warms up the anode exhaust gas.

As shown in FIG. 2, the cooling liquid passing through the coolant passage 20 is partially supplied to a coolant passage 32, where the supplied cooling liquid flows along an external peripheral surface of a drain pipe 32*a* from a drain valve 33 to a collecting portion 31 of the gas-liquid separator 30. The cooling liquid supplied this way subsequently returns to the homeward passage 13B. While the cooling liquid is circulating as described above, the cooing liquid running through the coolant passage 20 provides heat to the drain pipe 32*a*, the drain valve 33 and the collecting portion 31 by heat exchange, so that these three components are warmed up. If there is frozen product water, which is separated from the anode exhaust gas, it will be thawed out. This permits further discharging of product water newly separated from the anode exhaust gas. In addition, because the collecting portion 31 and the drain pipe 32*a* are warmed up, it is possible to prevent refreezing of the product water. Furthermore, because the supply passage 35 is warmed up, it is possible to prevent condensation of the product water before it is introduced into the ejector 40. It should be noted that the temperature of the cooling liquid supplied to the coolant passage 32 is controlled so as to fall in an appropriate range so that product water accumulated in the collecting portion 31 may not evaporate. It is preferable but not mandatory that the cooling liquid should be selectively supplied to the coolant passage 32 according to temperature conditions, such as a low-temperature condition at a start when the fuel cell 10 or other components are not warmed up and a condition of low ambient temperature below freezing point.

The cooling liquid returned to the homeward passage 13B, which further circulates in the homeward passage 13B along with a cooling liquid having passed through the coolant passage 20, flows into the heat exchanger 11, where the joined cooling liquids reject heat. The cooling liquids are then ejected toward the fuel cell 10 by the circulating pump 12.

In the embodiment described above, it has been described that the coolant passage 32 exemplarily corresponds to a fluid passage for warming which is disposed so as to be attached to the collecting portion 31 and the drain pipe 32*a*. It has been also described that the cooling liquid (cooling medium), for example, corresponds to a fluid coming out of the fuel cell 10. The present invention is not limited to this setup, but it may be alternatively possible to adopt other passages, such as a passage 15 for anode exhaust gas, a supply passage 35, a passage for cathode exhaust gas and an air supply passage. In this case it may be that corresponding fluids are an anode exhaust gas, a cathode exhaust gas and a cathode gas.

It has been described that the drain pipe 32*a* lies inside the coolant passage 32, as shown in FIG. 2, but the present invention is not limited to this setup. It may be alternatively possible to externally dispose a drain pipe 32*a* on a coolant pipe 32 so that they can be in good contact with each other.

In the fuel cell system according to the present embodiment described above, the gas-liquid separator 30 and the ejector 40 are neighbored each other and the coolant passage 20 is disposed downstream of the fuel cell 10 between the gas-liquid separator 30 and the ejector 40. While it flows through the supply passage 35, the anode exhaust gas having passed through the gas-liquid separator 30 is warmed up by the cooling liquid, whose temperature has risen after passing through the fuel cell 10. This warmed-up anode exhaust gas is sent to the ejector 40 via the supply passage 30. In this way, even if the reaction product water has not been completely separated by the gas-liquid separator 30 and the anode exhaust gas flowing through the supply passage 35 contains moisture, the fuel cell system according to the present invention is able to supply the anode exhaust gas to the ejector 40 without condensation. In other words, the fuel cell system is able to decrease relative humidity of the anode exhaust gas. Therefore, it is possible to prevent dew formation in the anode exhaust gas while passing through the supply passage 35. This results in a protection for supplying a reaction gas containing liquid product water to the fuel cell 10, which brings about an excellent fuel cell system in terms of stability of power generation.

In addition, because the cooling liquid for cooling the fuel cell 10 is available for warming up the anode exhaust gas, it may not be necessary to prepare an additional heat source. In this way, the present invention provides a fuel cell system, which contributes not only to better stability of power generation but also to a cost reduction, which results from minimum number of parts required for the system.

Because the cooling liquid rejects heat in the coolant passage 20 and the coolant passage 32, it is possible to adopt a heat exchanger in smaller volume, which leads to miniaturization of a fuel cell system.

Because the gas-liquid separator 30 and the ejector 40 are neighbored each other, it is possible to efficiently warm up the anode exhaust gas in the supply passage 35, which is sent from the gas-liquid separator 30 to the ejector 40.

Because the cooling liquid flowing through the coolant passage 32 efficiently warms up the drain valve 33 and the drain pipe 32a during a cold start, it is possible not only to prevent blockage of the drain pipe 32a due to freezing of the product water separated by the gas-liquid separator 30, but also to promptly thaw out frozen product water.

The drain pipe 32a and the outer pipe 32b are arranged so that a downstream of the drain pipe 32a corresponds to an upstream of the outer pipe 32b. Because this setup permits the cooling liquid to warm up the downstream of the drain pipe 32a, which is more susceptible to freezing, earlier than its upstream. In this way, it is possible to efficiently prevent freezing of drain in the drain pipe 32a.

It will now be appreciated from the foregoing description that the present invention is not limited to the particularly illustrated embodiment discussed above and may be carried out in various modified forms. Although description has been given of the embodiment in which a fuel cell system according to the present invention is applied to a fuel cell electric vehicle, for example, it may be alternatively possible to apply the system not only to movable bodies such as a vessel and an airplane but also to a fixed power generating unit.

In the embodiment described above, a PEM fuel cell is selected for the fuel cell system, the present invention is not limited to this type of fuel cell. It may be alternatively possible to adopt other types of fuel cells, such as an alkaline fuel cell and phosphoric acid fuel cell. Also, it may be possible to make various changes and modifications to the layout of units belonging to the fuel cell system without departing from the spirit and scope of the present invention.

It may be alternatively possible to dispose a coolant passage upstream of the fuel cell instead of its downstream as described above in the present embodiment.

In the present embodiment, the collecting portion 31 is a polygonal pyramid having a sectional shape like a reversed triangle, but the present invention is not limited to this configuration. It may be alternatively possible to adopt a rectangular parallelepiped or a cylinder. It may also be alternatively possible to adopt an anode exhaust gas or a cathode exhaust gas instead of the cooling liquid. Furthermore, it may be alternatively possible to make these fluids flow in an opposite direction with respect to the direction X2 shown in FIG. 1.

Foreign priority documents, JP 2004-323537 filed on Nov. 8, 2004 and JP 2004-338377 filed on Nov. 24, 2004, are hereby incorporated by reference.

What is claimed is:

1. A fuel cell system comprising:
    a fuel cell for generating power with supply of a reaction gas;
    a drain pipe and a drain valve;
    a fluid passage for warming the drain pipe and the drain valve;
    a gas-liquid separator arranged for separating moisture contained in an anode exhaust gas which is discharged from the fuel cell;
    a supply passage arranged for returning the anode exhaust gas, from which the moisture is separated by the gas-liquid separator, to a recirculating module arranged for mixing the anode exhaust gas, which is returned via the supply passage, with the reaction gas;
    a mount in which the fluid passage for warming is provided; and
    a collecting portion for collecting water which is separated by the gas-liquid separator;
    wherein the drain pipe is for discharging the water collected in the collecting portion, the drain pipe being extended from the collecting portion, in which the fluid passage for warming lies in thermal contact with the drain pipe and a fluid coming out of the fuel cell flows through the fluid passage for warming,
    wherein the drain valve is arranged downstream of the gas-liquid separator at an upstream portion of the drain pipe, in which the fluid passage for warming lies in thermal contact with the drain valve,
    wherein the gas-liquid separator and the recirculating module are attached under and above the mount, respectively, so as to be integrally configured,
    the supply passage is disposed between the gas-liquid separator and the recirculating module so that the supply passage runs in contact with a peripheral surface of the fluid passage for warming,
    at least a portion of the fluid passage for warming also serves as a coolant passage through which a cooling liquid for cooling the fuel cell passes, wherein the coolant passage is disposed downstream of the fuel cell, and
    the cooling liquid is warmed up while passing through the fuel cell, wherein the cooling liquid flows through the coolant passage and is again supplied to the fuel cell through a heat exchanger by a pump and
    a downstream portion of the drain pipe is arranged to lie in thermal contact with an upstream portion of the fluid passage for warming so that the drain pipe can be efficiently warmed.

2. A fuel cell system according to claim 1, further comprising a collecting portion for collecting water which is separated by the gas-liquid separator, the collecting portion being provided under the gas-liquid separator, wherein the fluid passage for warming lies in thermal contact with the collecting portion.

3. A fuel cell system according to claim 2, wherein the fluid passage for warming is attached to the collecting portion.

4. A fuel cell system according to claim 1, further comprising a collecting portion for collecting water which is separated by the gas-liquid separator, the collecting portion being provided under the gas-liquid separator, wherein the fluid passage for warming lies in thermal contact with the collecting portion, and wherein one of a fluid coming out of the fuel cell and an oxidant gas to be introduced into the fuel cell flows through the fluid passage for warming.

5. A fuel cell system according to claim 4, wherein the fluid passage for warming is attached to the collecting portion.

6. A fuel cell system according to claim 4, wherein the fluid is at least one of the anode exhaust gas discharged from the fuel cell and a cooling medium which circulates to cool the fuel cell.

7. A fuel cell system according to claim 1, wherein the drain pipe lies inside the fluid passage for warming.

8. A fuel cell system according to claim 1, wherein the drain pipe lies on an external surface of the fluid passage for warming.

9. A fuel cell system according to claim 1, wherein the fluid is at least one of the anode exhaust gas discharged from the fuel cell and a cooling liquid which circulates to cool the fuel cell.

* * * * *